United States Patent
Saito

(10) Patent No.: US 6,894,213 B2
(45) Date of Patent: May 17, 2005

(54) INFORMATION PROCESSING DEVICE FOR NOTIFYING OF PROGRESS OF INFORMATION PROCESS BY MUSIC, AND MEDIUM

(75) Inventor: Sanae Saito, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/372,096

(22) Filed: Feb. 25, 2003

(65) Prior Publication Data

US 2003/0137764 A1 Jul. 24, 2003

Related U.S. Application Data

(63) Continuation of application No. PCT/JP00/06311, filed on Sep. 14, 2000, now abandoned.

(51) Int. Cl.[7] ................................................. G10H 7/00
(52) U.S. Cl. ........................... 84/601; 700/94; 708/172; 84/602; 345/727
(58) Field of Search ................................. 345/727, 729; 84/600–609; 700/94; 708/172; 710/18, 19

(56) References Cited

U.S. PATENT DOCUMENTS

| | | | | |
|---|---|---|---|---|
| 4,374,429 A | * | 2/1983 | Cannon et al. | 710/67 |
| 5,511,187 A | * | 4/1996 | Cragun | 707/8 |
| 5,715,412 A | * | 2/1998 | Aritsuka et al. | 345/729 |
| 6,192,490 B1 | * | 2/2001 | Gross | 714/47 |
| 6,297,818 B1 | * | 10/2001 | Ulrich et al. | 715/500.1 |
| 6,467,688 B1 | * | 10/2002 | Goldman et al. | 235/472.01 |
| 2003/0187526 A1 | * | 10/2003 | Wright | 700/94 |

FOREIGN PATENT DOCUMENTS

| | | |
|---|---|---|
| JP | 03-005839 | 1/1991 |
| JP | 05-100808 | 4/1993 |
| JP | 05-188947 | 7/1993 |
| JP | 05-282129 | 10/1993 |
| JP | 08-076967 | 3/1996 |
| JP | 09-185530 | 7/1997 |
| JP | 10-063548 | 3/1998 |
| JP | 11-065740 | 3/1999 |
| JP | 11-110178 | 4/1999 |
| JP | 2000-020197 | 1/2000 |

* cited by examiner

*Primary Examiner*—Marlon T. Fletcher
*Assistant Examiner*—David S. Warren
(74) *Attorney, Agent, or Firm*—Staas & Halsey LLP

(57) ABSTRACT

A technique for indicating the progress or end of information processing without the need for the user to view the screen. An information processor (1) which instructs a sound reproducer (9) reproduce music, comprising an information processing unit (2) for processing information, a designation recording unit (3, 4) for recording the designation of music data selected on the basis of the progress of information processing, and a control unit (2) for judging the progress of the information processing and commanding the sound reproducer (9) to reproduce the selected music data.

30 Claims, 15 Drawing Sheets

FIG. 4

| NAME | SIZE | REMARKS |
|---|---|---|
| UNIT OF DEGREE OF PROGRESS | 0 × 00000004 (INTEGER) | UNIT (PERCENTAGE) OF DEGREE OF PROGRESS FOR CHANGING MUSIC FOR REPLAYING |
| REPLAY MOUSIC COUNT | 0 × 00000004 (INTEGER) | THE NUMBER OF PIECES OF MUSIC TO BE REPLAYED |
| CONTAINED ARE FOLLOWING ELEMENTS FOR REPLAY MUSIC COUNT | | |
| CATEGORY OF REPLAY MUSIC | 0 × 00000004 (INTEGER) | CATEGORY OF MUSIC TO BE REPLAYED (CD:0, FILE:1) |
| REPLAY TRACK NUMBER | 0 × 00000004 (INTEGER) | CD TRACK NUMBER FOR REPLAYING, ※ VALID WHEN REPLAY MUSIC CATEGORY IS 0 |
| REPLAY FILE NAME | 0 × 00000208 (UNICODE) | FILE NAME OF MUSIC TO BE REPLAYED ※ VALID WHEN THE REPLAY MUSIC CATEGORY IS 1 |

FIG. 5

| NAME | EXAMPLES | EXPLANATION |
|---|---|---|
| UNIT OF DEGREE OF PROGRESS | 50% | EXAMPLE WHERE 50% IS SET IN THE UNIT OF DEGREE OF PROGRESS OF PROESSING, AND SELECT ONE PIECE OF MUSIC FROME EACH OF CD AND FILE |
| REPLAY MUSIC COUNT | 2 PIECES | |
| REPLAY MUSIC CATEGORY | 0 | |
| REPLAY TRACK NUMBER | TRACK 3 | |
| REPLAY FILE NAME | NULL | |
| REPLAY MUSIC CATEGORY | 1 | |
| REPLAY TRACK NUMBER | 0 | |
| REPLAY FILE NAME | C¥:¥Windows¥Media¥Canyon.midi | |

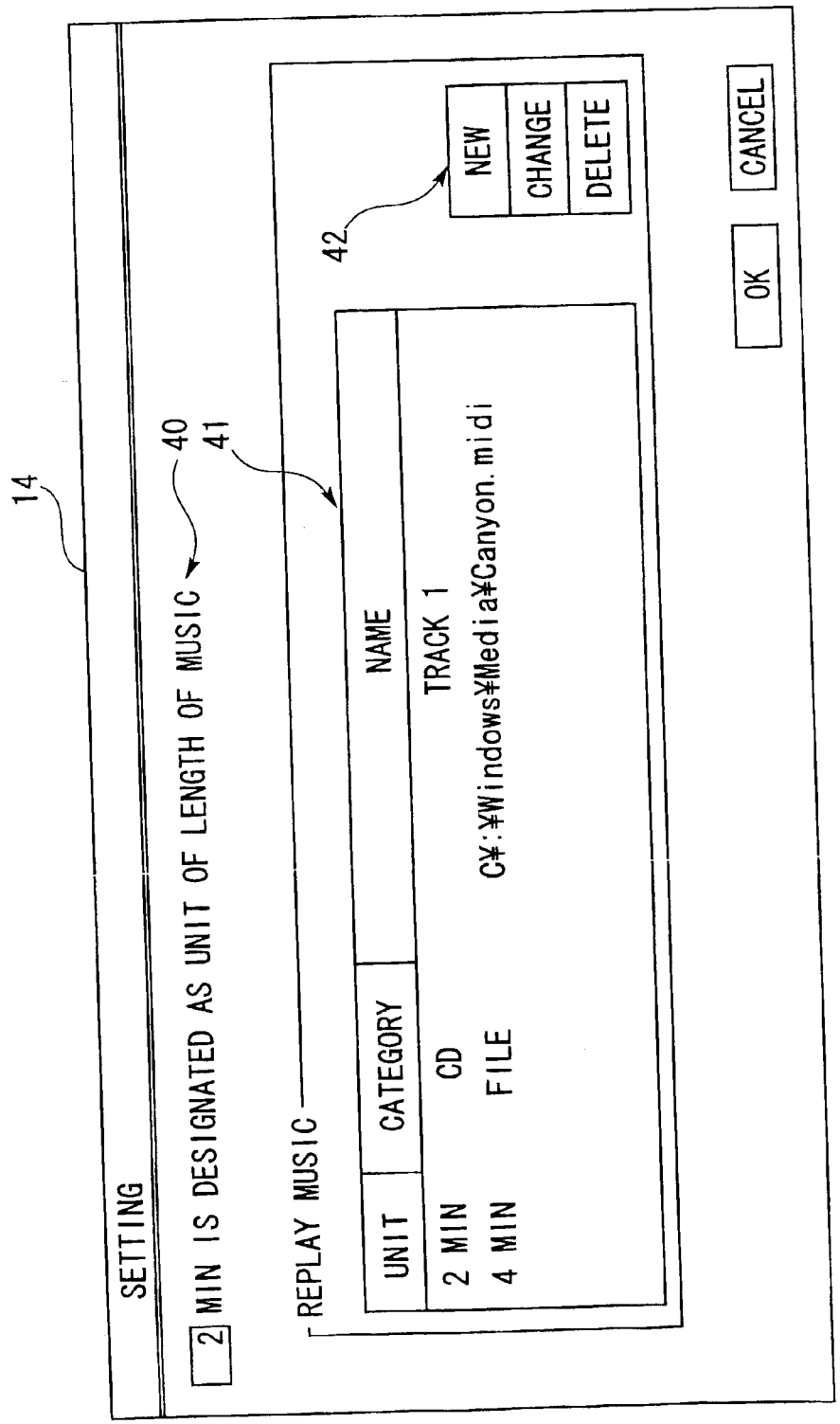

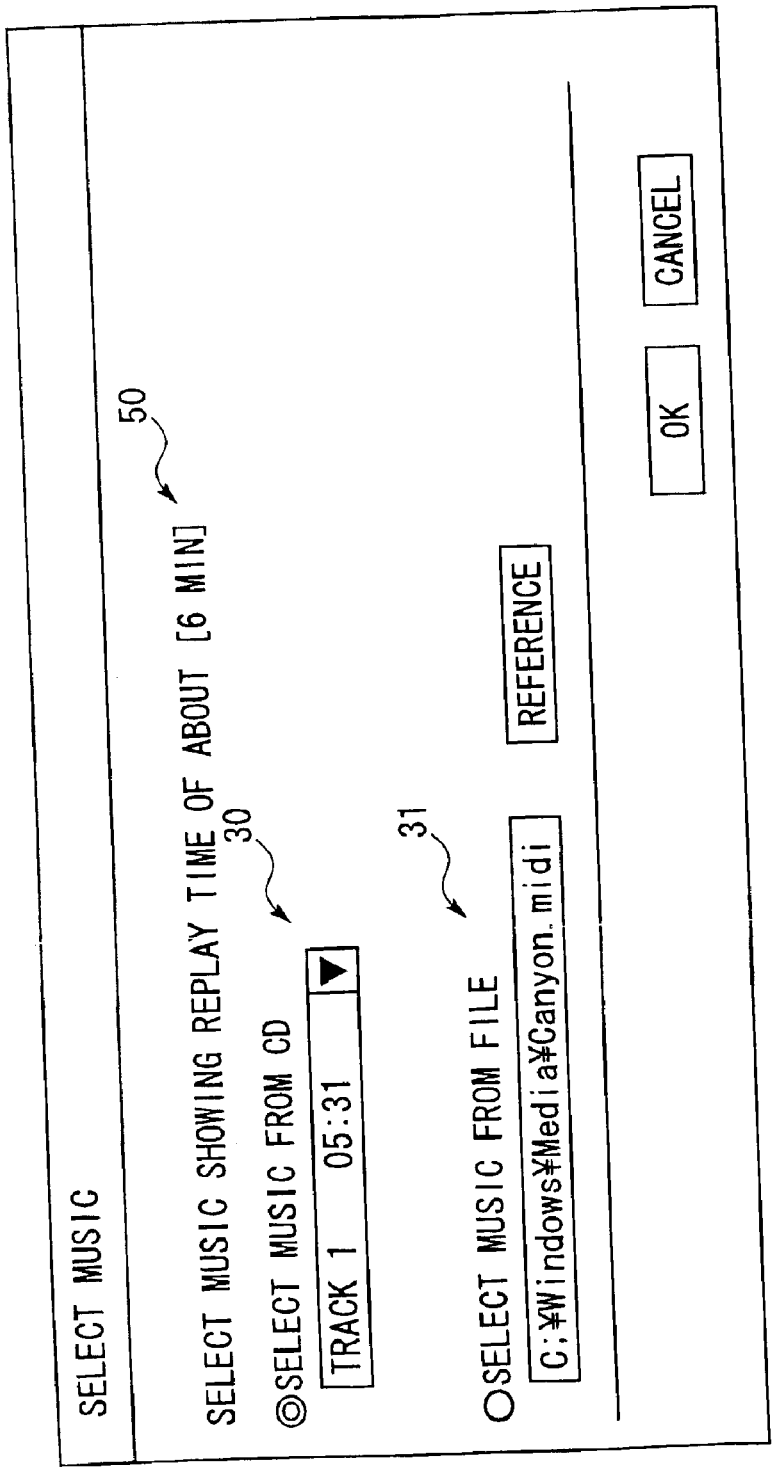

FIG. 9

| NAME | SIZE | REMARKS |
|---|---|---|
| UNIT OF TIME | 0×00000004 (INTEGER) | UNIT OF TIME AS STANDARD WHEN OBTIANING REPLAY MUSIC |
| RECORD MUSIC COUNT | 0×00000004 (INTEGER) | THE NUMBER OF PIECES OF MUSIC TO BE REPLAYED |
| CONTAINED ARE FOLLOWING ELEMENTS FOR RECORD MUSIC COUNT | | |
| CATEGORY OF REPLAY MUSIC | 0×00000004 (INTEGER) | CATEGORY OF MUSIC TO BE REPLAYED (CD:0, FILE:1) |
| REPLAY TRACK NUMBER | 0×00000004 (INTEGER) | CD TRACK NUMBER FOR REPLAYING, ※ VALID WHEN REPLAY MUSIC CATEGORY IS 0 |
| REPLAY FILE NAME | 0×00000208 (UNICODE) | FILE NAME OF MUSIC TO BE REPLAYED ※ VALID WHEN THE REPLAY MUSIC CATEGORY IS 1 |

FIG. 10

| NAME | EXAMPLES | EXPLANATION |
|---|---|---|
| UNIT OF TIME | EVERY 2 MIN | EXAMPLE WHERE MUSIC IS DESIGNATED ON 2-MIN UNIT, ONE PIECES OF MUSIC IS SELECTED FROM CD, AND TWO PIECES OF MUSIC ARE SELECTED FROM FILE |
| REPLAY MUSIC COUNT | 3 PIECES | |
| REPLAY MUSIC CATEGORY | 0 | |
| REPLAY TRACK NUMBER | TRACK 3 | |
| REPLAY FILE NAME | NULL | |
| REPLAY MUSIC CATEGORY | 1 | |
| REPLAY TRACK NUMBER | 0 | |
| REPLAY FILE NAME | C:¥Windows¥Media¥Canyon.midi | |
| REPLAY MUSIC CATEGORY | 1 | |
| REPLAY TRACK NUMBER | 0 | |
| REPLAY FILE NAME | C:¥Windows¥Media¥Passport.midi | |

FIG. 13

| NAME | SIZE | REMARKS |
|---|---|---|
| REPLAY MOUSIC COUNT | 0×00000004 (INTEGER) | THE NUMBER OF PIECES OF MUSIC TO BE REPLAYED |
| CONTAINED ARE FOLLOWING ELEMENTS FOR REPLAY MUSIC COUNT | | |
| CATEGORY OF REPLAY MUSIC | 0×00000004 (INTEGER) | CATEGORY OF MUSIC TO BE REPLAYED (CD:0, FILE:1) |
| REPLAY TRACK NUMBER | 0×00000004 (INTEGER) | CD TRACK NUMBER FOR REPLAYING. ※ VALID WHEN REPLAY MUSIC CATEGORY IS 0 |
| REPLAY FILE NAME | 0×00000208 (UNICODE) | FILE NAME OF MUSIC TO BE REPLAYED ※ VALID WHEN THE REPLAY MUSIC CATEGORY IS 1 |

FIG. 14

| NAME | EXAMPLES | EXPLANATION |
|---|---|---|
| REPLAY MUSIC COUNT | 2 PIECES | EXAMPLE WHERE ONE PIECES OF MUSIC IS SELECTED FROM EACH OF CD AND FILE |
| REPLAY MUSIC CATEGORY | 0 | |
| REPLAY TRACK NUMBER | TRACK 3 | |
| REPLAY FILE NAME | NULL | |
| REPLAY MUSIC CATEGORY | 1 | |
| REPLAY TRACK NUMBER | 0 | |
| REPLAY FILE NAME | C¥:¥Windows¥Media¥Canyon.midi | |

INFORMATION PROCESSING DEVICE FOR NOTIFYING OF PROGRESS OF INFORMATION PROCESS BY MUSIC, AND MEDIUM

This is a continuation of Application PCT/JP00/06311, filed on Sep. 14, 2000, now abandoned.

BACKGROUND OF THE INVENTION

1. Technical Field

The present invention relates to notifying of a state of progress of processing by a computer.

2. Background Arts

In information processing that requires a considerable period of time till a completion of processing such as installing a program into the computer, converting data, transmitting and receiving the data and so on, the computer notifies a user of a state of progress of processing or a completion of processing by use of the following techniques.

(a) The state of progress, e.g., a degree of progress at the present and a processing time at the present time, are displayed by numerical values and a bar graph during the processing.

(b) A message showing the completion is displayed in a message box when the processing is completed.

(c) An alarm and a beep are reproduced when the processing is completed.

In these conventional techniques, however, the state of progress of the information processing is displayed on a screen, and hence the user is required to see the screen in order to grasp the state of progress.

Further, the message is displayed when the information processing is completed, so that the user needs to see the screen in order to grasp the completion of the processing. Moreover, in the case of notifying of the completion by the beep, the user requires not to fail to hear the beep.

SUMMARY OF THE INVENTION

The present invention was devised in view of the above problems inherent in the prior arts. It is an object of the present invention to provide a technology enabling a user to grasp a state of progress of information processing and a completion of the processing without seeing a screen.

Further, it is another object of the present invention to provide a technology capable of facilitating user's grasp of a completion of the information processing.

To accomplish the above objects, the present invention adopts the following means.

Namely, according to the present invention, an information processing device (1) making a sound replay device (9) replay music comprises an information processing unit (2) for executing information processing, a designation recording unit (3, 4) recording a designation of music data selected corresponding to a state of progress of the information processing, and a control unit (2) judging how the state of progress of the information processing is, and commanding the sound replay device (9) to replay the music selected in accordance with the designation recording unit.

Herein, the sound replay device (9) may be what is externally attached to the information processing device (1). Further, the sound replay device (9) may be what is installed inside the information processing device (1).

Thus, the designated pieces of music are changed and played as the information processing progresses, and therefore the user is able to easily grasp the state of progress of the information processing without seeing a screen.

Preferably, this information processing device (1) may further comprise a music data setting unit (5, 12) setting the music data selected corresponding to the state of progress of the information processing.

Further, according to the present invention, an information processing device (1) making a sound replay device replay music (9) comprises an information processing unit (2) executing information processing, a designation recording unit (3) recording a designation of music data selected corresponding to a processing time of the information processing, and a control unit (2) for judging what the processing time of the information processing is, and giving a command of replaying in parallel with the information processing of the music data selected in accordance with the designation recording unit.

Thus, the designated music is selected corresponding to the processing time and played in parallel with executing the information processing, and hence, the user can easily grasp the processing time of the information processing without seeing the screen.

Preferably, this information processing device (1) may further comprise a music data setting unit (5, 14) setting the music data selected corresponding to the processing time.

Preferably, the information processing device (1) may further comprise a music replay time changing unit (2) increasing and decreasing a replay time of the music data in accordance with the processing time.

Moreover, according to the present invention, an information processing device (1) making a sound replay device replay music, comprises an information processing unit (2) executing information processing, a designation recording unit (3, 4) recording a designation of music data to be replayed when the information processing is completed, and a control unit (2) giving a command of replaying when the information processing is completed.

Thus, with the completion of the information processing, the designated music is played, and the user is therefore able to easily grasp the completion of the information processing.

Preferably, this information processing device may, further comprise a music data setting unit (5, 16) setting the music data to be replayed when the information processing is completed.

Furthermore, according to the present invention, an information processing method in an information processing device (1) to which a sound replay device (9) is connected, comprises recording a designation of music data selected corresponding to a state of progress of information processing, judging how the state of progress of the information processing is (S8), selecting the music data based on the designation (S5), and giving a command of replaying the music data (S7).

Preferably, this information processing method may further comprise designating the music data selected corresponding to the progress of the information progress.

Still further, according to the present invention, an information processing method in an information processing device (1) to which a sound replay device (9) is connected, comprises recording a designation of music data selected corresponding to a processing time of information processing, judging what the processing time of the information processing is (S11), selecting the music data based on the designation (S14, S15), and giving a command of replaying in parallel with the information processing of the music data (S21).

Preferably, this information processing method may further comprise designating the music data selected corresponding to the processing time of the information processing.

Preferably, this information processing method may further comprise increasing and decreasing a replay time of the music data in accordance with the processing time (S20).

Yet further, according to the present invention, an information processing method in an information processing device (1) to which a sound replay device (9) is connected, comprises recording a designation of music data replayed when information processing is completed, judging whether the information processing is completed, referring to the designation of the music data (S31), and giving a command of replaying the music when judging that the information processing is completed (S34).

Preferably, this information processing method may further comprise designating the music data replayed when the information processing is completed.

According to the present invention, there may be provided a program making a computer execute the steps described above. Such a program, which is recorded on a storage medium readable by the computer and other device, machine etc, may be read and executed by the computer etc. Further, according to the present invention, there may be provided data communication signals embodied in carrier waves containing those program codes.

BRIEF DESCRIPTION OF THE DRAWINGS

FIG. 4 is a diagram of a data structure of music replay control data in the first embodiment;

FIG. 5 shows a data example of the music replay control data in the first embodiment;

FIG. 7 shows an example of a setting screen 14 for setting the music to be replayed in a second embodiment;

FIG. 8 shows an example of a music selection screen in the second embodiment;

FIG. 9 is a diagram of a data structure of the music replay control data in the second embodiment;

FIG. 10 shows a data example of the music replay control data in the second embodiment;

FIG. 13 is a diagram of a data structure of the music replay control data in the third embodiment;

FIG. 14 shows a data example of the music replay control data in the third embodiment.

DETAILED DESCRIPTION OF THE PREFERRED EMBODIMENT

A best mode for carrying out the present invention will hereinafter be explained in accordance with embodiments.

<<First Embodiment>>

Figure 1:
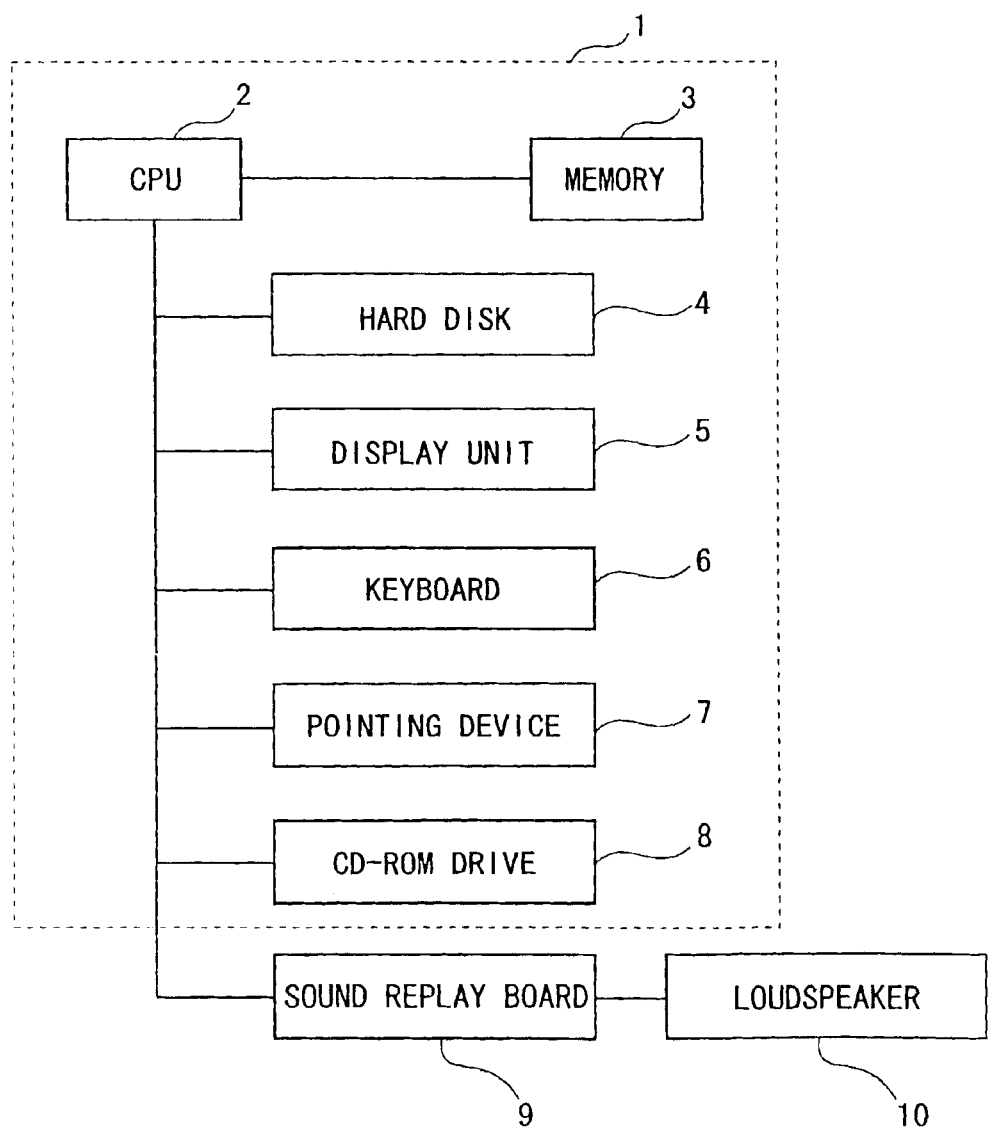
FIG. 1 is a diagram of a hardware architecture of an information processing device 1.
Figure 2:
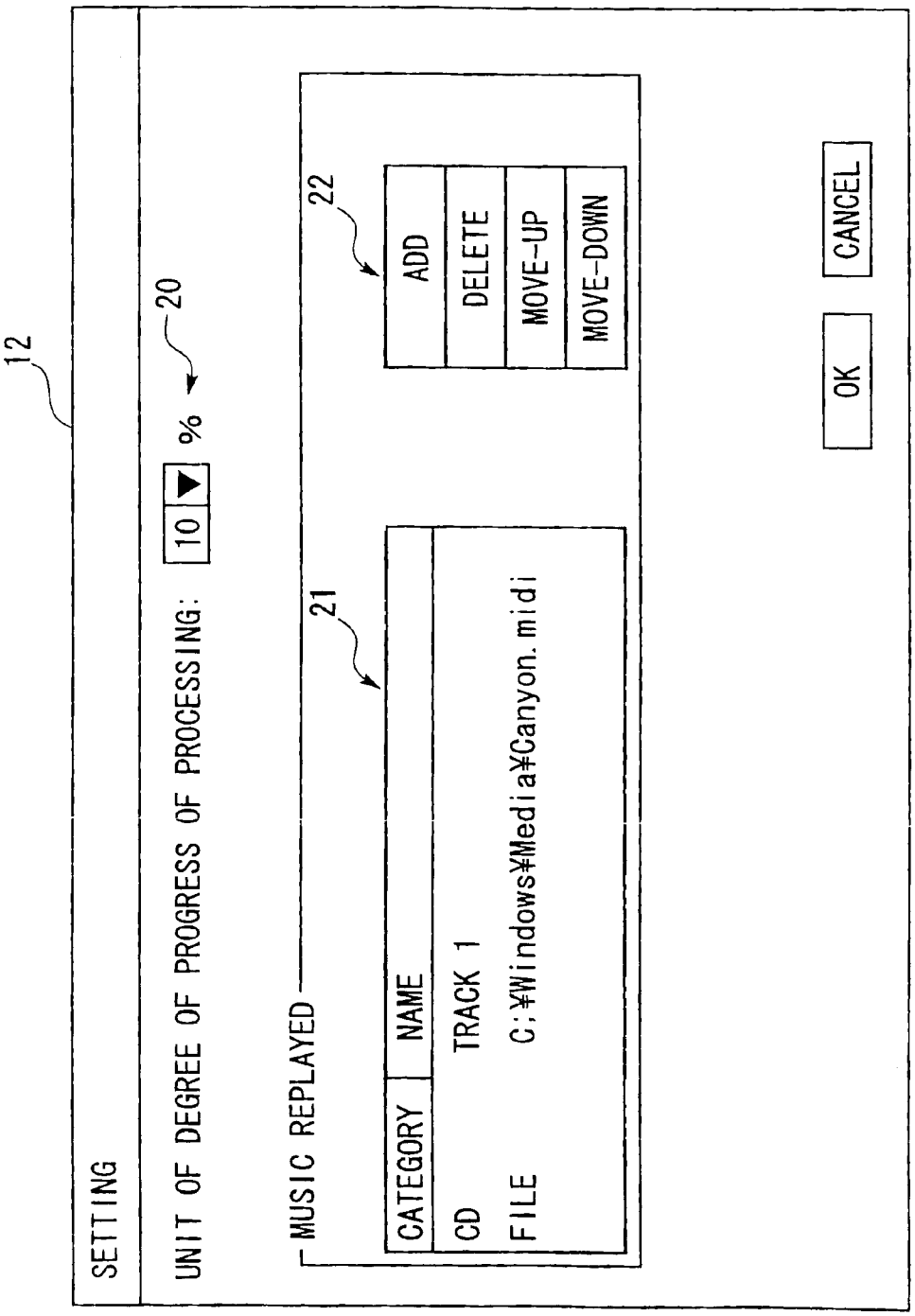
FIG. 2 shows an example of a setting screen 12 for setting a piece of music to be replayed in a first embodiment.
Figure 3:
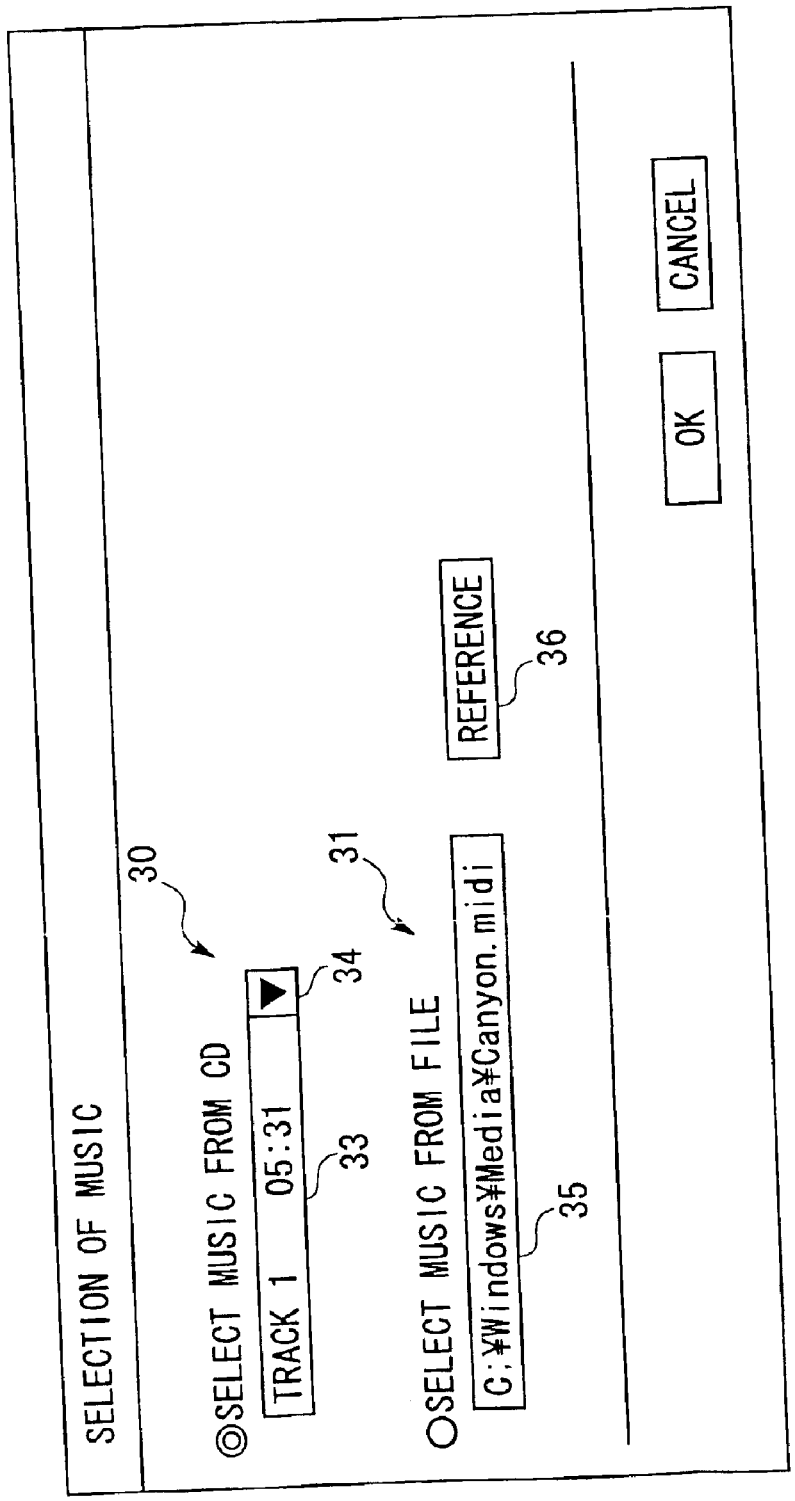
FIG. 3 shows an example of a music selection screen in the first embodiment.
Figure 6:
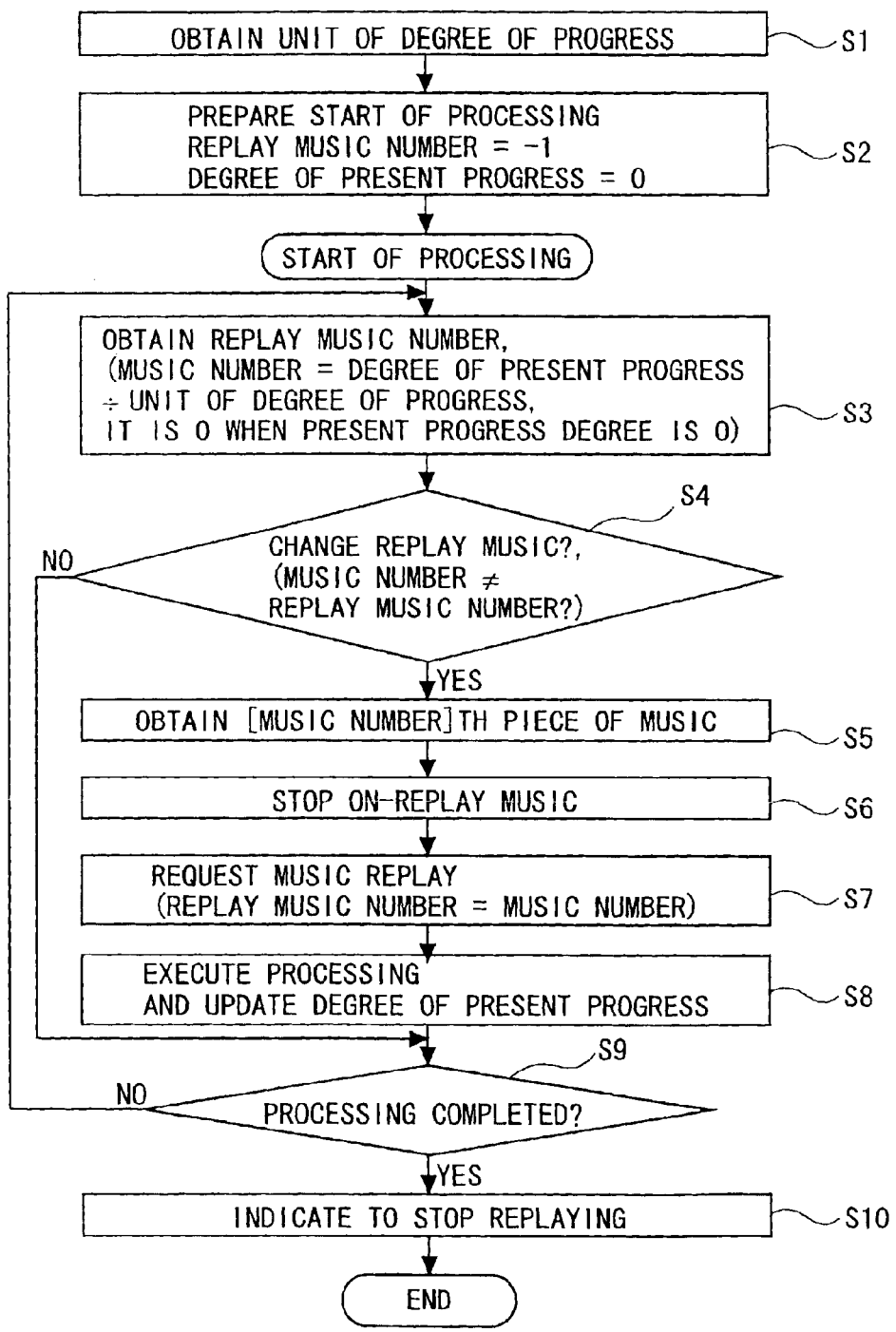
FIG. 6 is a flowchart showing processes of a music replay control program in the first embodiment.

An information processing device 1 in a first embodiment of the present invention will be explained with reference to FIGS. 1 through 6. FIG. 1 is a diagram of a hardware architecture of this information processing device 1. FIG. 2 shows an example of a setting screen 12 for setting a piece of music to be replayed on this information processing device 1. FIG. 3 shows an example of a music selection screen to be displayed when an add button is pressed on the setting screen 12. FIG. 4 is a diagram of a data structure of music replay control data (which corresponds to designating music data) of this information processing device 1. FIG. 5 shows a data example of the music replay control data. FIG. 6 is a flowchart showing processes of a music replay control program executed by a CPU 2 in FIG. 1.

<Outline of Functions>

The present information processing device 1 sequentially replays different pieces of music in accordance with a degree of progress of information processing. With this, the present information processing device 1 enables the user to listen to the music and grasp the degree of progress.

Herein, the information processing connotes, for example, an installation of an application program, a data conversion, an information search, data transfer via a network and so on.

The degree of progress implies a rate of completed processing in the whole processes of the application program. For an example, this is a rate of a downloaded data size to a total data size in downloading the data. This degree of progress is grasped from that processing, e.g., the application program by which the downloading is executed.

The present information processing device 1 sequentially replays the music specified by the user at an each period corresponding to each degree of progress, e.g., at every 10% of the whole processes as the user specifies.

<Hardware Architecture>

FIG. 1 shows a hardware architecture of this information processing device 1. The information processing device 1 includes a CPU 2 for executing the programs, a memory 30 for storing the programs executed by the CPU 2 and the data processed by the CPU 2, a hard disk 4 for recording the programs and the data, a display unit 5 for displaying pieces of information such as menus, icons, messages etc, a keyboard 6 for inputting character data, a pointing device 7 for manipulating the menus and icons on the display unit 7, and a CD-ROM drive 8 for reading the data from a CD-ROM. Further, a sound replay board 9 and a loudspeaker 10 are connected to this information device 1.

The CPU 2 executes the programs stored on the memory 3, thereby providing a function as the information processing device 1.

The memory 3 is stored with the programs executed by the CPU 2 and the data processed by the CPU 2.

The hard disk 4 is recorded with the programs executed by the CPU 2 and the data etc processed by the CPU 2.

The display unit 5 displays the information inputted by the user and pieces of information such as the menu of the programs, the icons, the messages and so forth. For example, a CRT, a liquid crystal display etc are utilized as the display unit 5.

The keyboard 6 is used for inputting the character data. The pointing device 7 is used for manipulating the menus and the icons displayed on the display unit 5. For instance, a mouse, a trackball, an electrostatic pointing device, a laser pointing device, a touch panel etc can be used as the pointing device 7.

The sound replay board 9 includes an unillustrated control unit, a DA converter and an amplifier. This sound replay board 9, based on a command from the CPU 2, generates a sound from music data and outputs the sound to the loudspeaker 10.

<Screen Layout>

FIG. 2 shows an example of the setting screen 12 for setting the music to be replayed. This setting screen 12 contains a progress degree display box 20 provided in an upper area on the screen, a music data display box 21 provided in a central area on the screen, an operation button suite 22 provided on the right side of the screen, and an "OK" button and a "cancel" button that are provided in a lower area on the screen.

A unit of the degree of progress for changing the music is displayed in the progress degree display box 20. A unit "%" is indicated in the example of FIG. 2. Further, this progress degree display box 20 has a push button taking a triangular shape. When the user presses the push button, the indication of the degree of progress changes from 0 up to 100 in accordance with a press count.

Moreover, if the user continues to press the push button, for the duration of this pressing, the degree of progress indicated continuously increases. With such an operation, the user sets the unit of the degree of progress for changing the music.

A list of the music replayed corresponding to the degree of progress is displayed on the music data display box 21. The music data display box 21 is structured of a category field and a name filed. The category field shows a category of a music data recording medium for the music to be replayed.

In this embodiment, a CD (compact disk) or a file in the hard disk 4 can be specified as the data recording medium.

Herein, the CD is not limited to an audio CD as exemplified in this embodiment, and CD-ROMs formatted otherwise may also be available. Note that in the case of the CD-ROM, the file recorded thereon is, it follows, specified by a method of specifying the file in the hard disk 4.

Moreover, a name of a recording area within the data recording medium, e.g., a track number of the CD, a file name of the hard disk 4 etc are displayed in the name field.

The operation button suite 22 consists of an "add" button, a "delete" button, a "move-up" button and a "move-down" button. The "add" button is a button for additionally specifying the music to be replayed. The "delete" button" is a button for deleting the specified music displayed in the music data display box 21. The "move-up" button is a button for scrolling up the indication in the music data display box 21, i.e., in a direction of an earlier replay order. The "move-down" button is a button for scrolling down the indication in the music data display box 21, i.e., in a direction of a later replay order.

Upon pressing the "OK" button, a content of setting is saved on the hard disk 4, and the setting screen 12 is terminated. Upon pressing the "cancel" button, the content of setting is discarded, and the setting screen 12 is terminated.

FIG. 3 shows a music selection screen displayed when pressing the "add" button on the setting screen 12 in FIG. 13. This music selection screen contains, from an upper area on the screen down to a lower area thereon, a CD music selection box 30 for selecting the music data from the CD, a file music selection box 31 for selecting the music data from the file of the hard disk 4, an "OK" button and a "cancel" button.

The CD music selection box 30 contains a replay track display field 33 and a push button 34 taking a triangular shape. The user presses this push button 34 by the pointing device 7 and is thereby able to change a CD track to be replayed. The track selected by the push button 34 is displayed in the replay track display field 33.

The file music selection box 31 contains a replay file display field 35 and a reference button 36. The user has an unillustrated file selection dialog displayed by pressing the reference button 36, and can select a music data file. The file selected in this file selection dialog is displayed in a replay file display field 35.

Upon pressing the "OK" button, the music selection screen is terminated, the selected CD replay track or the selected file of the hard disk 4 is displayed in the music data display box 21 in FIG. 2. Upon pressing the "cancel" button, the content of the operation is discarded with the result that the music selection screen is terminated, and the control returns to the setting screen 12 in FIG. 2.

<Data Structure of Music Replay Control Data>

FIG. 4 shows a diagram of a data structure of music control data of the information processing device 1. A setting content set on the setting screen 12 shown in FIG. 2 is saved in a music replay control data format on the hard disk 4. The hard disk 4 saved with the music replay control data or the memory 3 stored with the music replay control data, corresponds to a designation recording unit.

The music replay control data are structured of a progress degree unit, a replay music count, and a music data designation column for the replay music count. A replay music category, a replay track number and a replay file name are repeated for the replay music count in the music data designation column. Any one of the replay track file number and the replay file name is, however, valid from a designation of the replay music category.

A unit of the degree of progress for changing the music to be replayed is retained in the "progress degree unit". According to this embodiment, the unit of the degree of progress is the percentage. The number of pieces of music to be replayed is retained in the "replay music count".

Any one of the CD (a value "0") or the file (a value "1") of the hard disk 4 is specified in the "replay music category".

The "replay track number" is a track number of the CD track to be replayed. Further, a to-be-replayed file name within the hard disk 4 is specified in the "replay file name". In this embodiment, the replay file name is a fixed-length area of 520 characters at the maximum.

FIG. 5 shows a data example of the music replay control data. In this example, the unit of the degree of progress is 50%, the replay music count is 2, and a first music data designation is that the replay music category is the CD (the value "0"), the replay track number is 3, and the replay file name is NULL (null area). Further, a second music data designation is that the replay music category is the file (the value "1"), the replay track number is 0, and the replay file name is C:¥Windows¥Media¥Canyon.midi.

In this setting, the track number "1" of the CD is replayed till the degree of progress comes to 50%, and the music recorded in the file C:¥Windows¥Media¥Canyon.midi of the hard disk 4 is replayed for the duration of 50% through 100% as the degree of progress.

<Operation and Effects>

FIG. 6 is a flowchart showing processes of a music replay control program executed by the CPU 2 in FIG. 1. The CPU 2 executing this music replay control program corresponds to a control unit.

This program is executed at all times in background in the CPU 2 of the information processing device 1. This program is normally in its standby status for an instruction from the application program.

When starting the application program, e.g., when starting copying the file, this application program at first notifies the music replay control program that the processing has been started up. With this notification, the CPU 2 moves the control to the music replay control program and starts preparing the processing.

To begin with, the CPU 2 obtains the "unit of the degree of progress" from the music replay control data retained on the hard disk 4 (S1).

Next, the CPU 2 sets a parameter "replay music number" to −1 and a parameter "degree of present progress" to 0 for preparing a start of processing (S2). Herein, the "replay music number is a parameter for retaining the music number during a replay at the present. Further, the "degree of present progress" is a parameter for retaining the degree of progress of the processing, of which the application program notifies.

Next, the CPU 2 calculates the "music number" as a number of the music that should be replayed (S3). To be specific, the "music number" of the music to be replayed is calculated by dividing the "degree of present progress" by the "unit of the degree of progress".

Next, the CPU 2 judges whether the replay music should be changed or not (S4). Namely, if the "replay music number" is not coincident with the "music number" calculated in S3, it is judged that the replay music should be changed, and the CPU 2 advances the control to S5. If the "replay music number" is coincident with the "music number" calculated in S3, the CPU 2 advances the control to S9.

In the case of changing the replay music, the CPU 2 obtains a storage location of the music data in a position determined by the "music number" from the music replay control data retained on the hard disk 4 (S5).

Next, the CPU 2 commands a music replay module of an OS so as to stop the music that is now replayed (S6).

Next, the CPU 2 commands the music replay module of the OS to replay the music afresh (S7). At this time, the CD track number or the file name of the hard disk 4 is transferred to the music replay module of the OS. This triggers replaying the new music.

Next, the CPU 2 acquires the degree of the present progress from the application program, and sets it in the "degree of present progress" (S8).

Next, the CPU 2 judges whether the processing is completed or not (S9). The completion of the processing is judged from whether the application program notifies of the completion thereof. If the processing is not completed, the CPU 2 returns the control to S3.

While on the other hand, if the processing is completed, the CPU 2 commands the music replay module of the OS to stop the music (S10). Thereafter, the CPU 2 terminates the processes of the music replay control program. With this termination, the music replay control program returns again to the standby status for an instruction.

As explained above, in the present information processing device 1, the designated pieces of music are replayed sequentially corresponding to the degree of progress of the application program. Therefore, the user is able to grasp the degree of progress of the application program without seeing the display unit 5.

<Modified Example>

In the information processing device 1 according to the embodiment discussed above, the CD or the file of the hard disk 4 can be designated as the recording medium of the music to be replayed. The embodiment of the present invention is not, however, limited to these categories of the music data recording medium. For example, a demountable medium such as a DVD (Digital Video Disk), an MD (Mini Disk) etc may also be used.

In the embodiment discussed above, the music replay program is started in the background before replaying the music and is in its standby status for the instruction. The embodiment of the present invention is not, however, restricted to the above step of starting the music replay control program. For instance, the music replay control program may be, though not executed in the normal status, started when the application program gives an instruction of replaying the music. Further, the music replay program module may be linked as an application program module. In this case, the program linkage may take either a static linkage or a dynamic linkage.

<<Second Embodiment>>

Figure 11:
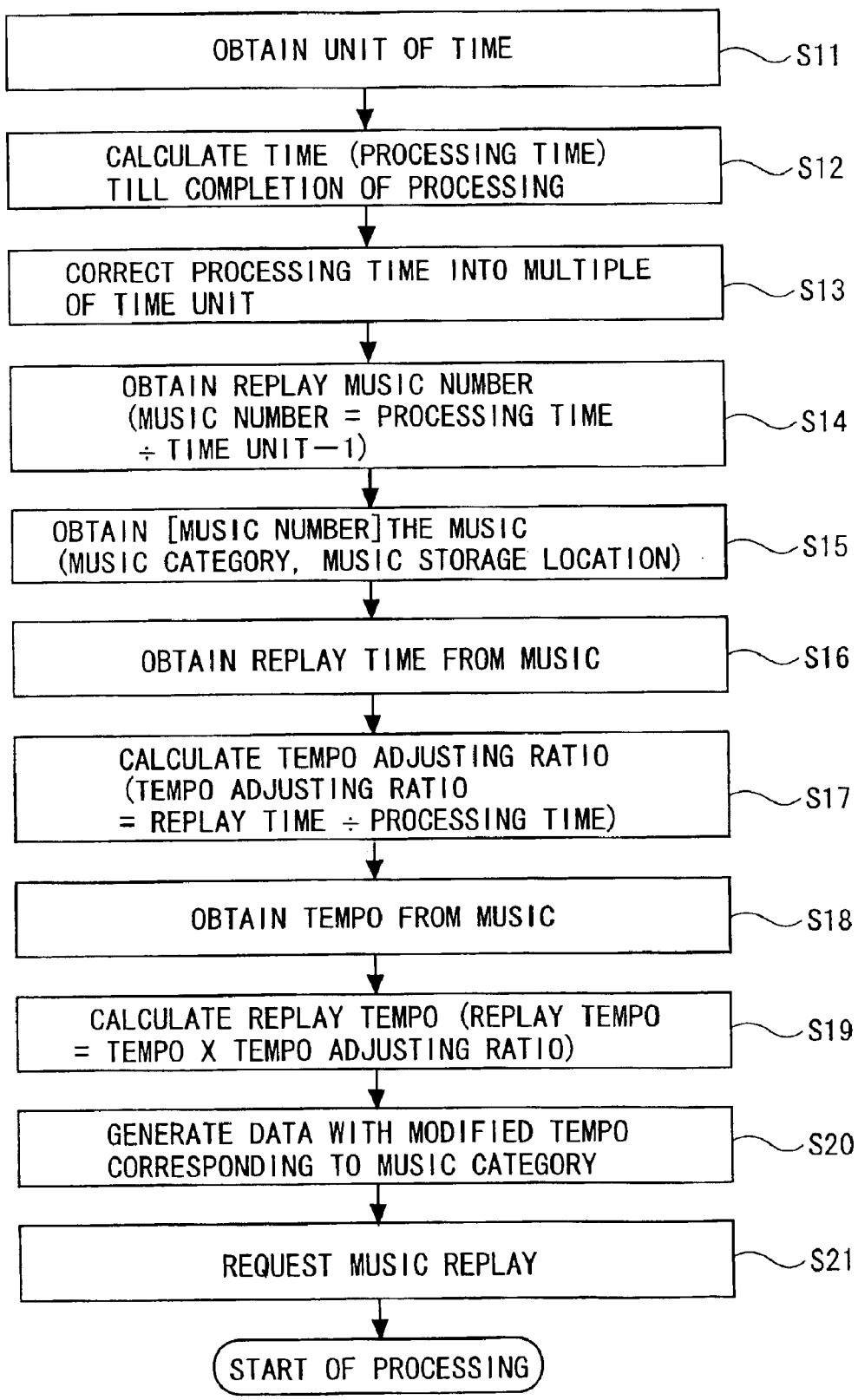
FIG. 11 is a flow chart showing processes of the music replay control program in the second embodiment.

The information processing device 1 in a second embodiment of the present invention will be explained referring to drawings of FIGS. 7 through 11. FIG. 7 shows an example of a setting screen 14 for setting the music to be replayed in this information processing device 1. FIG. 8 shows an example of a music selection screen displayed when a "new" button is pressed on the setting screen 14 in FIG. 7. FIG. 9 is a diagram of a data structure of the music replay control data of this information processing device 1. FIG. 10 shows a data example of the music replay control data. FIG. 11 is a flowchart showing processes of the music replay control program executed by the CPU 2 in FIG. 1.

The information processing device 1 in the first embodiment discussed above replays a different piece of music corresponding to the degree of progress of the application program, and has the degree of progress grasped by the user. According to the second embodiment, the information processing device 1 replays one piece of music in accordance with executing the application program, and completes the replay of the music with a completion of processing. A hardware architecture of the information processing device 1 is the same as that in FIG. 1, and therefore its explanation is omitted. Further, the same elements in the screen layout and the data structure in the second embodiment as those in the first embodiment, are marked with the same numerals, and their explanations are omitted.

<Screen Layout>

FIG. 7 shows an example of a setting screen 14 for setting the music to be replayed. This setting screen 14 contains a time unit indication box 40 provided in an upper area on the screen, a music data display box 41 provided in a central area on the screen, an operation button suite 42 provided on the right side of the screen, and an "OK" button and a "cancel" button that are provided in a lower area on the screen.

A time unit on which the music is selected based, is specified in a time unit indication box 40. For instance, if 2 min. is specified, there are specified pieces of music having lengths differing for every 2 min. such as 2 min., 4 min., 6 min. and so on. Then, the music having the length approximate to a processing time of the application program is selected and replayed. Namely, this time unit is a resolution on a time base for judging the processing time of the application program.

A list of the music data selected corresponding to the processing time of the application program is displayed in the music data display box 41. For example, if the processing time is approximately 2 min., the track number "1" of the CD is selected. In the case of 4 min., a file C:¥Windows¥Media¥Canyon.midi etc of the hard disk 4 is selected.

The operation button suite 42 consists of a "new" button, a "change" button and a "delete" button. The "new" button is a button for designating the music to be replayed afresh. The "change" button is a button for changing the music data displayed in the music data display box 21. The "delete" button is a button for deleting the designation of the music displayed in the music data display box 21.

Upon pressing the "OK" button, a content of the setting is saved on the hard disk 4, and the setting screen 14 is terminated. Upon pressing the "cancel button", the content of the setting is discarded, and the setting screen 14 is terminated.

FIG. 8 shows a music selection screen displayed when the "new" button is pressed on the setting screen 14 in FIG. 7. This music selection screen contains, from an upper area on the screen down to a lower area, a guide message area 50, a CD music selection box 30 for selecting the music data from the CD, a file music selection box 31 for selecting the music data from the file of the hard disk 4, an "OK" button and a "cancel" button.

For example, a message [Select music having a replay time of approximately [6 min.]] is displayed in the guide message area 50 in FIG. 8. This is because 2 min. is designated as the time unit on the setting screen 14 in FIG. 7, the 2-min music and the 4-min music have been already set, and a next 2-min interval length is 6 min.

Functions of the CD music selection box 30, the file music selection box 31, the "OK" button and the "cancel" button are the same as those in FIG. 3 in the first embodiment, and hence their explanations are omitted.

<Data Structure of Music Replay Control Data>

FIG. 9 shows a diagram of a data structure of the music replay control data of the information processing device 1. The content of the setting set on the setting screen 14 shown in FIG. 7 is saved on the hard disk 4 in the music replay control data format.

The music replay control data consists of a time unit, a record music count and music data designation column for the record music count.

The time unit is a resolution in time for judging a processing time of the application program when selecting the music. The processing time of the application program is judged in a way that rounds off it on this time unit.

The record music count is the number of sorts of pieces of music recorded in the music replay control data.

The music data designation column for the record music count is the same information as the music data designation column for the replay music count shown in FIG. 3 in the first embodiment, and hence its explanation is omitted.

FIG. 10 shows a data example of the music replay control data. In this example, the time unit is 2 min., the replay music count is 3, and a first music data designation is that the replay music category is the CD (the value "0"), the replay track number is 3, and the replay file name is NULL (null area).

Further, a second music data designation is that the replay music category is the file (the value "1"), the replay track number is 0, and the replay file name is C:¥Windows¥Media¥Canyon.midi.

Moreover, a third music data designation is that the replay music category is the file (the value "1"), the replay track number is 0, and the replay file name is C:¥Windows¥Media¥Passport.midi.

In this setting, the track number "3" of the CD is replayed during an execution of the processing of which a processing time is approximately 2 min., a piece of music recorded in the file C:¥Windows¥Media¥Canyon.midi of the hard disk 4 is replayed in a case where the processing time is about 4 min., and a piece of music recorded in the file C:¥Windows¥Media¥Passport.midi of the hard disk 4 is replayed in a case where the processing time is about 6 min.

<Operation and Effects>

FIG. 11 is a flowchart showing processes of the music replay control program executed by the CPU 2 in FIG. 1. The CPU 2 executes this program as a part of the application program.

When starting the application program, e.g., starting installing the program, at first, the CPU 2 obtains the "time unit" from the music replay control data retained on the hard disk 4 (S11).

Next, the CPU 2 calculates the "processing time" till the processing of the application program is completed (S12).

Next, the CPU 2 corrects the "processing time" so as to become a multiple of the time unit (S13). For this correction, anyone of round-off, round-up and round-down is set in environment setting.

Next, the CPU 2 calculates the "music number" as a music number to be replayed (S14). To be specific, the "music number" to be replayed is calculated in a way that divides the "processing time" by the "time unit" and further subtracting 1 therefrom.

For example, it is now assumed that the round-off is selected, the time unit is 1 min., and the processing time is three minutes thirty one seconds. Then, this processing time is rounded off to 4 minutes, and the music number "3" is selected based on the formula in S14.

Next, the category of the music data indicated by the music number and a storage location are acquired from the music replay control data (S15). Further, a replay time recorded together with the music data is obtained (S16).

Next, the CPU 2 calculates a tempo adjusting ratio is calculated (S17). The tempo adjusting ratio is a ratio of the replay time to the processing time corrected by the processing in S13.

Next, the CPU 2 obtains a music tempo from the music data (S18). Foe an example, the tempo is expressed by the number of quadruple notes replayed for one minute.

Next, the CPU 2 calculates a replay tempo (S19). The replay tempo is a value obtained by multiplying the music tempo by the tempo adjusting ratio in S17. The music is replayed at this replay tempo, whereby a music replay time is substantially coincident with a processing time of the application program. For example, however, if the round-off is set as correction described above, there occurs an error of ½ of the time unit at the maximum.

Next, the CPU 2 changes the tempo of the music data in accordance with the replay tempo (S20). This process depends on a music data format. For instance, the tempo is rewritten in a format where the tempo can be set inside the music data, e.g., in a MIDI format. Further, according to a format where the tempo can not be set inside the music data, e.g., a WAVE format, a length of the music data is changed by thinning out the data or inserting a redundant sound.

Next, the CPU 2 commands the music replay module of the OS to replay the music with the tempo changed (S21). At this time, a file name of the music data with the tempo modified is transferred to the music replay module of the OS. The replay of the music with the tempo changed is thereby started. This replay continues substantially the same period of time as the processing time of the application program. Thereafter, the processing of this application program is executed in parallel with the replay of the As explained above, in the present information processing device 1, the music corresponding to the processing time of the application program is selected and replayed in parallel with the processing of the application program. Therefore, the user is able to grasp the degree of progress of the application program without seeing the display unit 5.

<Modified Example>

In the embodiment discussed above, the tempo of the music data is changed corresponding to the replay tempo, and the new music data are created. The embodiment of the present invention does not, however, depend on this tempo changing method. For example, a tempo change function is provided in the music replay module of the OS, the music replay module of the OS may be requested to change the tempo.

In the embodiment discussed above, the music replay control program is linked as a part of the application program and executed. The embodiment of the present invention is not, however, limited to this program architecture. For example, the CPU 2 may execute the music replay control program as an independent program as in the case of the first embodiment. In this case, before replaying the music, a piece of information on a predicted processing time is received from the application program and may be substituted into the "processing time" described above and thus used.

In this case, the music replay control program may be executed beforehand in background and set in the standby status for an instruction. Further, the music replay control program may be started when replaying the music.

In the embodiment discussed above, the processing time of the application program is corrected based on the time unit. Without executing this correction, however, the music replay time may be increased and decreased or prolonged in accordance with the processing time of the application program.

<<Third Embodiment>>

Figure 12:
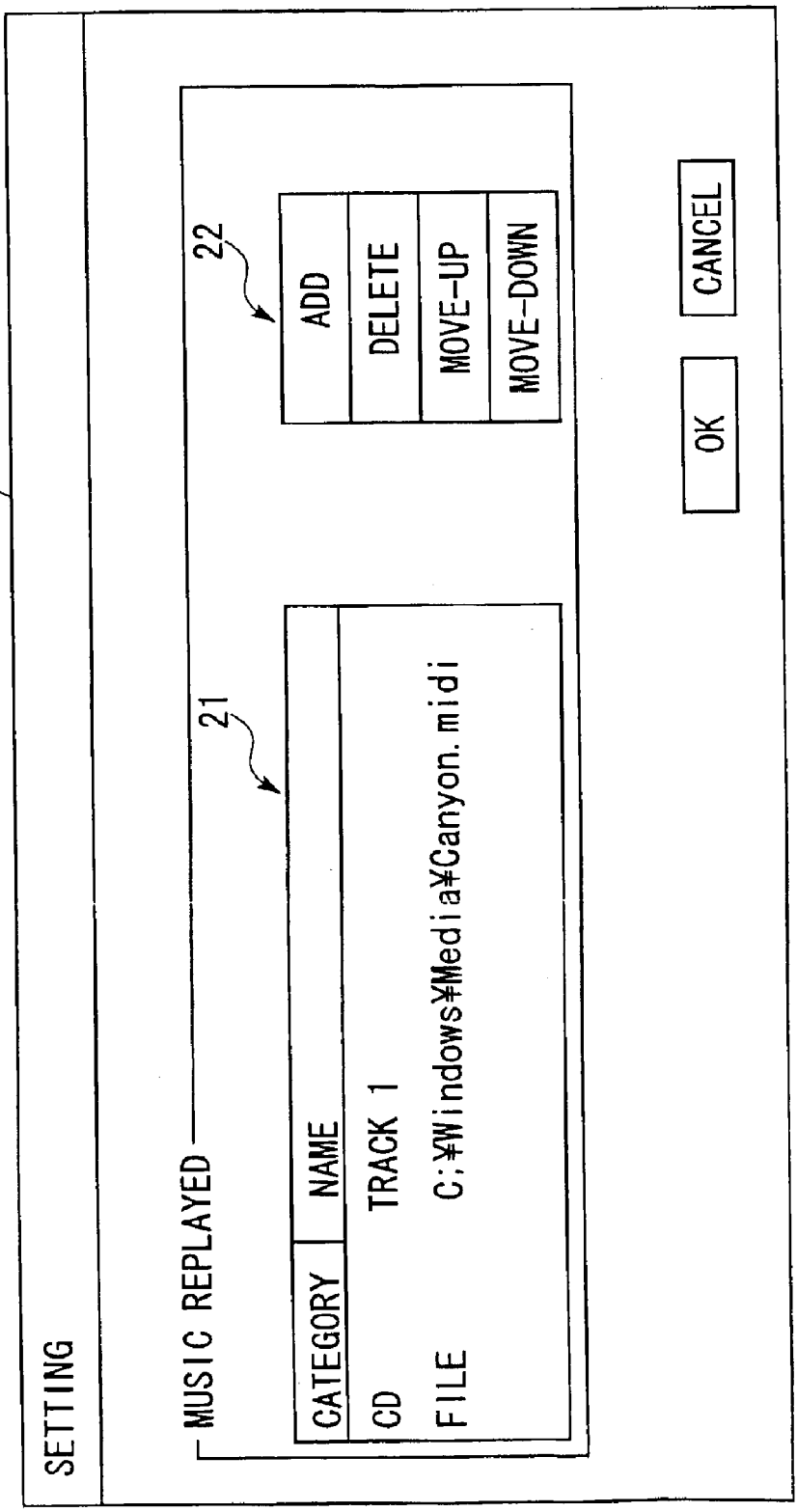
FIG. 12 shows an example of a setting screen 16 for setting the music to be replayed in a third embodiment.
Figure 15:
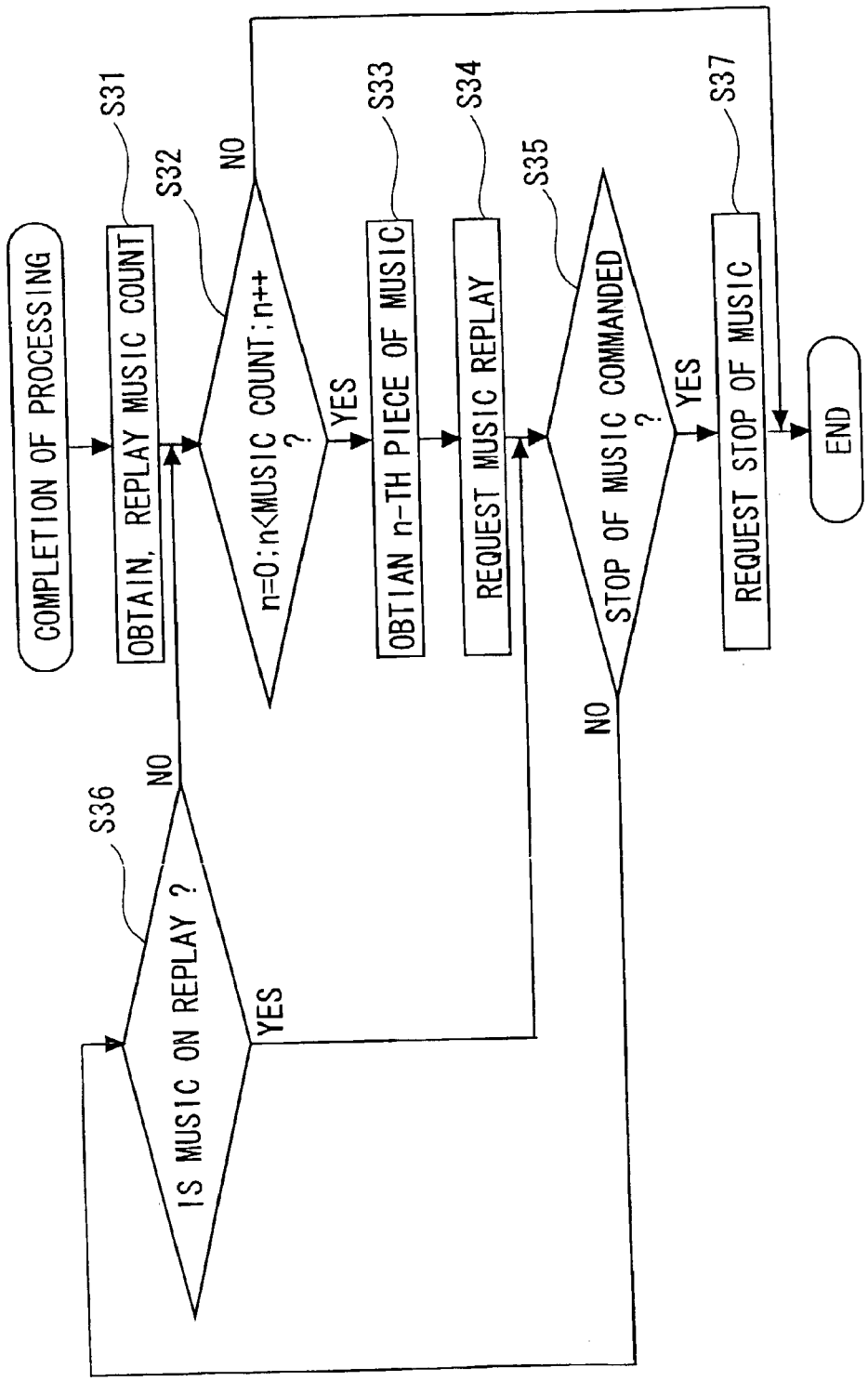
FIG. 15 is a flowchart showing processes of the music replay control program in the third embodiment.

The information processing device 1 in a third embodiment of the present invention will be explained referring to drawings of FIGS. 12 through 15. FIG. 12 shows an example of a setting screen 16 for setting the music to be replayed in this information processing device 1. FIG. 13 is a diagram of a data structure of the music replay control data of this information processing device 1. FIG. 14 shows a data example of the music replay control data. FIG. 15 is a flowchart showing processes of the music replay control program executed by the CPU 2 in FIG. 1.

According to the first embodiment discussed above, the information processing device 1 replays a different piece of music corresponding to the degree of progress of the application program, and has the degree of progress grasped by the user. Further, according to the second embodiment, the information processing device 1 selects the music data corresponding to the processing time of the application program, replays the music in parallel with the processing thereof, and finishes replaying the music with the completion thereof.

According to the third embodiment, the information processing device 1, when the processing of the application program is completed, replays a pre-designated piece of music. A hardware architecture of the information processing device 1 is the same as that in FIG. 1, and hence its explanation is omitted. Further, the same elements of a screen layout and a data structure in the third embodiment as those in the first embodiment, are marked with the same numerals, and their explanations are omitted.

<Screen Layout>

FIG. 12 shows an example of a setting screen on which the music to be replayed is set in this information processing device 1. This setting screen 16 contains a music data display box 21 provided in a central area on the screen, an operation button suite 22 provided on the right side of the screen, and an "OK" button and a "cancel" button that are provided in a lower area on the screen. These configurations are the same as those in FIG. 2 in the first embodiment, and therefore the explanations thereof are omitted.

<Data Structure of Music Replay Control Data>

FIG. 13 shows a diagram of a data structure of music control data of the information processing device 1. A setting content set on the setting screen 16 shown in FIG. 12 is saved in a music replay control data format on the hard disk 4.

The music replay control data are structured of a replay music count, and a music data designation column for the replay music count. The replay music count and the music data designation column for the replay music count are the same information as in the case of FIG. 3 according to the first embodiment, and their explanations are omitted.

FIG. 14 shows a data example of the music replay control data. In this example, the replay music count is 2, and a first music data designation is that the replay music category is the CD (the value "0"), the replay track number is 3, and the replay file name is NULL (null area).

Further, a second music data designation is that the replay music category is the file (the value "1"), the replay track number is 0, and the replay file name is C:¥Windows¥Media¥Canyon.midi.

In this setting, when the processing of the application program is completed, at first, the music recorded on the track having the track number "3" of the CD is replayed, and moreover the music recorded in the replay file name is C:¥Windows¥Media¥Canyon.midi is replayed. This music replay involves replaying all designated pieces of music or continues till the user presses an arbitrary key of the keyboard 6 or the pointing device 7.

<Operation and Effects>

FIG. 15 is a flowchart showing processes of a music replay control program executed by the CPU 2 in FIG. 1. This program is also executed at all times in background in the CPU 2 of the information processing device 1 as the program in the first embodiment is. This program is likewise normally in its standby status for an instruction from the application program.

Upon a completion of the processing of the application program, e.g., a completion of searching the database, the application program at first notifies the music replay control program that the processing has been completed. With this processing, the CPU 2 transfers the control to the music replay control program.

To start with, the CPU 2 obtains the "replay music count" from the music replay control data retained on the hard disk 4 (S31).

Next, the CPU 2 judges whether or not the replay of the music showing this "replay music count" is finished (S32).

This process is, as shown in FIG. 15, expressed in C-language such as (n=0; n<music count; n++). This is a process of incrementing a counter parameter n exhibiting an initial value "0" piece by piece and thus judging whether the counter parameter n exceeds the music count or not.

If n does not exceed the replay music count, the CPU 2 acquires a location of an n-th piece of music data (S33).

Next, the CPU 2 commands the music replay module of the OS to replay the music (S34). At this time, a track number of the CD or the file name of the hard disk 4 is transferred to the music replay module of the OS. The replay of this music is thereby started.

Next, the CPU 2 judges whether a music stop command based on the user's operation is detected or not (S35). If the music stop command is detected, the CPU 2 requests the music replay module of the OS to stop the music (S37) and finishes the processing.

Whereas if the music stop command is not detected, the CPU 2 judges whether the music is still in the process of being replayed (S36). If in the process of being replayed, the CPU 2 returns the control to S35. Whereas if not in the process of being replayed, the CPU 2 returns the control to S32.

Further, the CPU 2, when judging in S32 that the replay of the music exhibiting the "replay music count" has been finished, also terminates the processing. When terminating the processing, the music replay control program goes back to the standby status for an instruction from the application program.

As described above, in the present information processing device 1, after the completion of the processing of the application program, the designated pieces of music are replayed in sequence. The user is therefore able to grasp the completion of the processing of the application program.

<<Storage Medium Readable by Computer and other Devices and Machines>>

The music replay control program in each of the embodiments discussed above can be recorded on a storage medium readable by computer, other devices or machines (computer etc). Then, the computer etc reads and executes the music replay control program on this recording medium, whereby the computer etc can be made to function as the information processing device 1 exemplified in the embodiments discussed above.

Herein, the storage medium readable by computer etc connotes recording mediums capable of storing information such as data, programs etc electrically, magnetically, optically and mechanically or by chemical action, which can be read by the computer etc. What is demountable out of the computer etc among those recording mediums may be, e.g., a flexible disk, a magneto-optic disk, a CD-ROM, a CD-R/W, a DVD, a DAT, an 8 mm tape, a memory card etc.

Further, a hard disk, a ROM (Read Only Memory) and so on are given as fixed type storage mediums within the computer.

<<Data Communication Signal Embodied in Carrier Wave>>

Furthermore, the above music replay control program can be stored on the hard disk and the memory of the computer etc, and downloaded to other computers etc via communication media. In this case, the program is transmitted as data communication signals embodied in carrier waves via the communication media. Then, the computer etc downloaded with this program can be made to function as the information processing device 1 in the embodiments discussed above.

Herein, the communication media may be any one of cable communication mediums such as metallic cables including a coaxial cable and a twisted pair cable, optical communication cables, or wireless communication media such as satellite communications, ground wave wireless communications etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be any one of a modulated broadband signal and an unmodulated base band signal (corresponding to a case of setting a DC signal having a voltage of 0 as a carrier wave).

INDUSTRIAL APPLICABILITY

As discussed above, according to the present invention, the user is able to grasp the state of progress of the information processing and the completion of the processing without seeing the screen. Further, according to the present invention, the user can easily grasp the completion of the information processing. Accordingly, the present invention can be applied to an information processing industry utilizing the computer.

What is claimed is:

1. An information processing device making a sound replay device replay music, comprising:
an information processing unit executing information processing;
a designation recording unit recording a designation of music data selected corresponding to a state of progress of the information processing; and
a control unit judging how the state of progress of the information processing is, and commanding said sound replay device to replay the music data in parallel with the information processing.

2. An information processing device according to claim 1, further comprising a music data designating unit setting the music data selected corresponding to the state of progress of the information processing.

3. An information processing device making a sound replay device replay music, comprising:
an information processing unit executing information processing;
a designation recording unit recording a designation of music data selected corresponding to a processing time of the information processing; and
a control unit judging what the processing time of the information processing is, and commanding said sound replay device to replay the music data in parallel with the information processing.

4. An information processing device according to claim 3, further comprising a music data setting unit setting the music data selected corresponding to the processing time.

5. An information processing device according to claim 3, further comprising a music replay time changing unit increasing and decreasing a replay time of the music data in accordance with the processing time.

6. An information processing device making a sound replay device replay music, comprising:
an information processing unit executing information processing;
a designation recording unit recording a designation of music data to be replayed when the information processing is completed; and a control unit commanding the replaying of music data when the information processing is completed, wherein the music data designation is set according to the progress of the information processing.

7. An information processing device according to claim 6, further comprising a music data setting unit setting the music data to be replayed when the information processing is completed.

8. An information processing method in an information processing device to which a sound replay device is connected, said method comprising:
   recording a designation of music data selected corresponding to a state of progress of information processing;
   judging how the state of progress of the information processing is;
   selecting the music data based on the designation; and
   giving a command of replaying the music data, wherein the music data designation is set according to the progress of the information processing.

9. An information processing method in an information processing device to which a sound replay device is connected, said method comprising:
   recording a designation of music data selected corresponding to a state of progress of information processing;
   judging how the state of progress of the information processing is;
   selecting the music data based on the designation;
   giving a command of replaying the music data; and
   designating the music data selected corresponding to the progress of the information progress.

10. An information processing method in an information processing device to which a sound replay device is connected, said method comprising:
    recording a designation of music data selected corresponding to a processing time of information processing;
    judging what the processing time of the information processing is;
    selecting the music data based on the designation; and
    giving a command of replaying in parallel with the information processing of the music data.

11. An information processing method according to claim 10, further comprising designating the music data selected corresponding to the processing time of the information processing.

12. An information processing method according to claim 10, further comprising increasing and decreasing a replay time of the music data in accordance with the processing time.

13. An information processing method in an information processing device to which a sound replay device is connected, said method comprising:
    recording a designation of music data to be replayed when information processing is completed;
    judging whether the information processing is completed;
    referring to the designation of the music data; and
    giving a command of replaying the music when judging that the information processing is completed wherein the music data designation is set according to the progress of the information processing.

14. An information processing method according to claim 13, further comprising designating the music data replayed when the information processing is completed.

15. A storage medium readable by a machine tangibly embodying a program of instructions executable by the machine to perform method steps for making a computer to which a sound replay device is connected, execute information processing, said program comprising:
    recording a designation of music data selected corresponding to a state of progress of information processing;
    judging how the state of progress of the information processing is;
    selecting the music data based on the designation; and
    giving a command of replaying the music data, wherein the music data designation is set according to the progress of the information processing.

16. A storage medium readable by a machine tangibly embodying a program of instructions executable by the machine to perform method steps for making a computer to which a sound replay device is connected, execute information processing, said program comprising:
    recording a designation of music data selected corresponding to a state of progress of information processing;
    judging how the state of progress of the information processing is;
    selecting the music data based on the designation;
    giving a command of replaying the music data; and
    designating the music data selected corresponding to the progress of the information progress.

17. A storage medium readable by a machine tangibly embodying a program of instructions executable by the machine to perform method functions for making a computer to which a sound replay device is connected, execute information processing, said program comprising:
    recording a designation of music data selected corresponding to a processing time of information processing;
    judging what the processing time of the information processing is;
    selecting the music data based on the designation; and
    giving a command of replaying in parallel with the information processing of the music data.

18. A storage medium readable by a machine according to claim 17, wherein said program further comprises designating the music data selected corresponding to the processing time of the information processing.

19. A storage medium readable by a machine according to claim 17, wherein said program further comprises further comprises increasing and decreasing a replay time of the music data in accordance with the processing time.

20. A storage medium readable by a machine tangibly embodying a program of instructons executable by the machine to perform method functions for making a computer to which a sound replay device is connected, execute information processing, said program comprising:
    recording a designation of music data to be replayed when information processing is completed;
    judging whether the information processing is completed;
    referring to the designation of the music data; and
    giving a command of replaying the music when judging that the information processing is completed, wherein the music data designation is set according to the progress of information processing.

21. A storage medium readable by a machine according to claim 20, wherein said program further comprises designating the music data replayed when the information processing is completed.

22. An information processing device making a sound replay device replay music, comprising:
- an information processing unit executing information processing;
- a designation recording unit recording a designation of music data selected corresponding to a state of progress of the information processing;
- a control unit judging how the state of progress of the information processing is, and commanding said sound replay device to replay the music selected in accordance with said designation recording unit; and
- a music data designating unit setting the music data selected corresponding to the state of progress of the information processing, wherein the music data designation is set according to the progress of information processing.

23. An information processing device making a sound replay device replay music, comprising:
- an information processing unit executing information processing;
- a designation recording unit recording a designation of music data selected corresponding to a processing time of the information processing;
- a control unit judging what the processing time of the information processing is, and giving a command of replaying of the music data selected in accordance with said designation recording unit in parallel with the information processing; and
- a music data setting unit setting the music data selected corresponding to the processing time.

24. An information processing device making a sound replay device replay music, comprising:
- an information processing unit executing information processing;
- a designation recording unit recording a designation of music data selected corresponding to a processing time of the information processing;
- a control unit judging what the processing time of the information processing is, and giving a command of replaying of the music data selected in accordance with said designation recording unit in parallel with the information processing; and
- a music replay time changing unit increasing and decreasing a replay time of the music data in accordance with the processing time.

25. An information processing method in an information processing device to which a sound replay device is connected, said method comprising:
- recording a designation of music data selected corresponding to a state of progress of information processing;
- judging how the state of progress of the information processing is;
- selecting the music data based on the designation;
- giving a command of replaying the music data; and
- designating the music data selected corresponding to the progress of the information progress, wherein the music data designation is set according to the progress of information processing.

26. An information processing method in an information processing device to which a sound replay device is connected, said method comprising:
- recording a designation of music data selected corresponding to a processing time of information processing;
- judging what the processing time of the information processing is;
- selecting the music data based on the designation;
- giving a command of replaying in parallel with the information processing of the music data; and
- designating the music data selected corresponding to the processing time of the information processing.

27. An information processing method according to claim 26, further comprising increasing and decreasing a replay time of the music data in accordance with the processing time.

28. A storage medium readable by a machine tangibly embodying a program of instructions executable by the machine to perform method steps for making a computer to which a sound replay device is connected, execute information processing, said program comprising:
- recording a designation of music data selected corresponding to a state of progress of information processing;
- judging how the state of progress of the information processing is;
- selecting the music data based on the designation;
- giving a command of replaying the music data; and
- designating the music data selected corresponding to the progress of the information progress, wherein the music data designation is set according to the progress of information processing.

29. A storage medium readable by a machine tangibly embodying a program of instructions executable by the machine to perform method steps for making a computer to which a sound replay device is connected, execute information processing, said program comprising:
- recording a designation of music data selected corresponding to a processing time of information processing;
- judging what the processing time of the information processing is;
- selecting the music data based on the designation;
- giving a command of replaying in parallel with the information processing of the music data; and
- designating the music data selected corresponding to the processing time of the information processing.

30. A storage medium readable by a machine according to claim 29, wherein said program further comprises further comprises increasing and decreasing a replay time of the music data in accordance with the processing time.

* * * * *

UNITED STATES PATENT AND TRADEMARK OFFICE
CERTIFICATE OF CORRECTION

PATENT NO. : 6,894,213 B2
DATED : May 17, 2004
INVENTOR(S) : Sanae Saito

It is certified that error appears in the above-identified patent and that said Letters Patent is hereby corrected as shown below:

Column 16,
Lines 48-49, after "further comprises" delete "further comprises".
Line 52, change "instructons" to -- instructions --.

Column 18,
Lines 56-57, after "further comprises" delete "further comprises".

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,894,213 B2
APPLICATION NO. : 10/372096
DATED : May 17, 2004
INVENTOR(S) : Sanae Saito It is certified that error appears in the above-identified patent and that said Letters Patent is hereby corrected as shown below:

Column 16,
Lines 48-49, after "further comprises" delete "further comprises".
Line 52, change "instructons" to -- instructions --.

Column 18,
Lines 56-57, after "further comprises" delete "further comprises".

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,894,213 B2 |
| APPLICATION NO. | : 10/372096 |
| DATED | : May 17, 2005 |
| INVENTOR(S) | : Sanae Saito |

It is certified that error appears in the above-identified patent and that said Letters Patent is hereby corrected as shown below:

Column 16,
Lines 48-49, after "further comprises" delete "further comprises".
Line 52, changes "instructions" to --instructions--.

Column 18,
Lines 56-57, after "further comprises" delete "further comprises".

This certificate supersedes certificate of correction issued June 27, 2006

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 6,894,213 B2
APPLICATION NO.    : 10/372096
DATED              : May 17, 2005
INVENTOR(S)        : Sanae Saito Page 1 of 1

It is certified that error appears in the above-identified patent and that said Letters Patent is hereby corrected as shown below:

<u>Column 16,</u>
Lines 48-49, after "further comprises" delete "further comprises".
Line 52, changes "instructons" to --instructions--.

<u>Column 18,</u>
Lines 56-57, after "further comprises" delete "further comprises".

This certificate supersedes Certificate of Correction issued June 27, 2006 and August 22, 2006.

Signed and Sealed this

Eighth Day of May, 2007

JON W. DUDAS
*Director of the United States Patent and Trademark Office*